United States Patent
Gruaz

(10) Patent No.: US 7,525,070 B2
(45) Date of Patent: Apr. 28, 2009

(54) HOUSEHOLD APPLIANCE HINGE WITH TWO HINGED PANELS

(75) Inventor: Denis Gruaz, Villaz (FR)

(73) Assignee: SEB SA, Ecully (FR)

( * ) Notice: Subject to any disclaimer, the term of this patent is extended or adjusted under 35 U.S.C. 154(b) by 407 days.

(21) Appl. No.: 10/558,525

(22) PCT Filed: May 25, 2004

(86) PCT No.: PCT/FR2004/001289

§ 371 (c)(1),
(2), (4) Date: Sep. 8, 2006

(87) PCT Pub. No.: WO2004/109047

PCT Pub. Date: Dec. 16, 2004

(65) Prior Publication Data

US 2007/0101538 A1    May 10, 2007

(30) Foreign Application Priority Data

May 28, 2003  (FR) .................................. 03 06520

(51) Int. Cl.
*H05B 3/68* (2006.01)
*H05B 3/06* (2006.01)
*A47J 37/06* (2006.01)

(52) U.S. Cl. ........................... 219/480; 219/524; 99/372

(58) Field of Classification Search ... 219/443.1–468.2, 219/524, 532–541; 99/372–384, 422–427
See application file for complete search history.

(56) References Cited

U.S. PATENT DOCUMENTS

| 6,024,014 A | 2/2000 | Kasai |
| 6,064,042 A | 5/2000 | Glucksman et al. |
| 2002/0153366 A1 | 10/2002 | Glucksman et al. |

FOREIGN PATENT DOCUMENTS

| CH | 669 243 A | 2/1989 |
| DE | 11 84 393 B | 12/1964 |
| DE | 28 21 331 A1 | 11/1979 |
| DE | 199 35 983 A1 | 2/2001 |
| EP | 0 646 344 A | 4/1995 |
| EP | 0 696 430 A | 2/1996 |
| FR | 2 516 352 A | 5/1983 |
| FR | 2 687 133 A | 8/1993 |
| GB | 891 603 A | 3/1962 |
| GB | 972 813 A | 10/1964 |

OTHER PUBLICATIONS

International Search Report.

*Primary Examiner*—Sang Y Paik
(74) *Attorney, Agent, or Firm*—Robert F. Zielinski, Esq.

(57) ABSTRACT

Hinge (4) comprising at least one housing (6) formed in a first panel (2), and at least one rod (7) integral with a second panel (3) and rotationally mounted in the housing (6). According to the invention, the rod (7) is movable from a retracted position in which it is prevented from moving into the housing (6) when the two panels (2, 3) are in a correct mutual position, and a control element (9) movable from a release position to a locking position and adapted to cooperate with the rod (7) with the result that said rod is in the retracted and hinged positions when the control element (9) is in the release and locking positions, respectively.

20 Claims, 3 Drawing Sheets

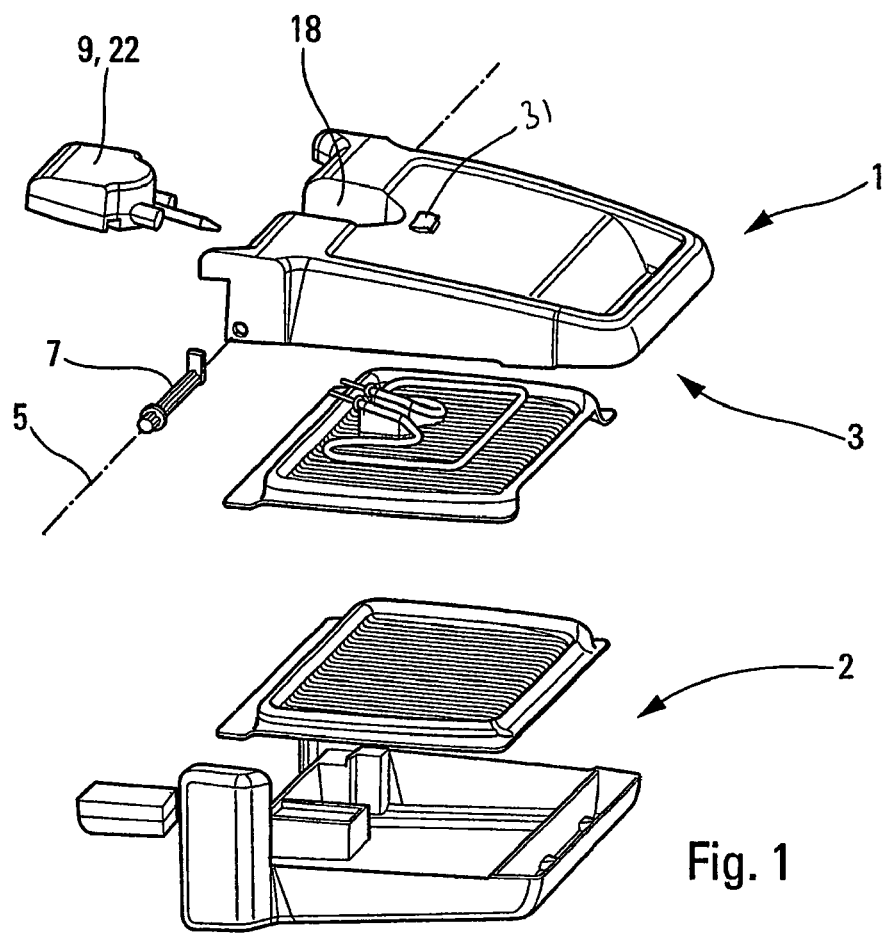
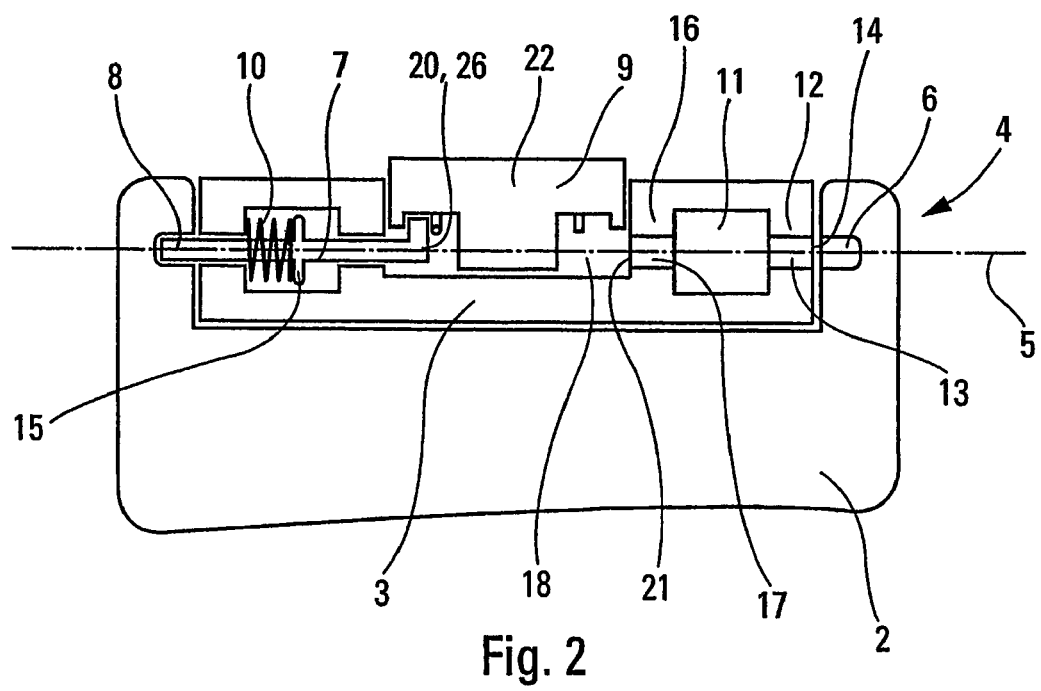

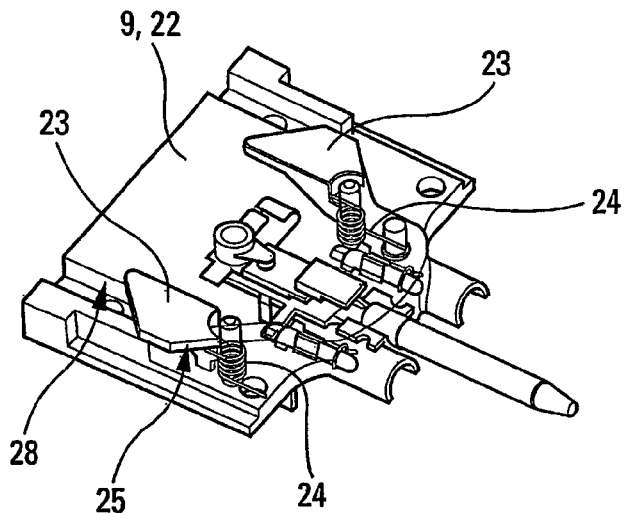
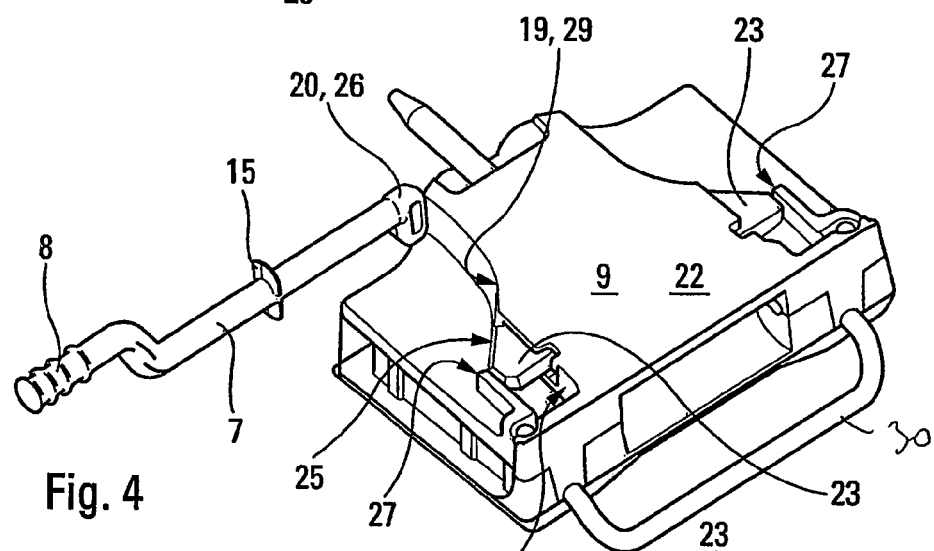
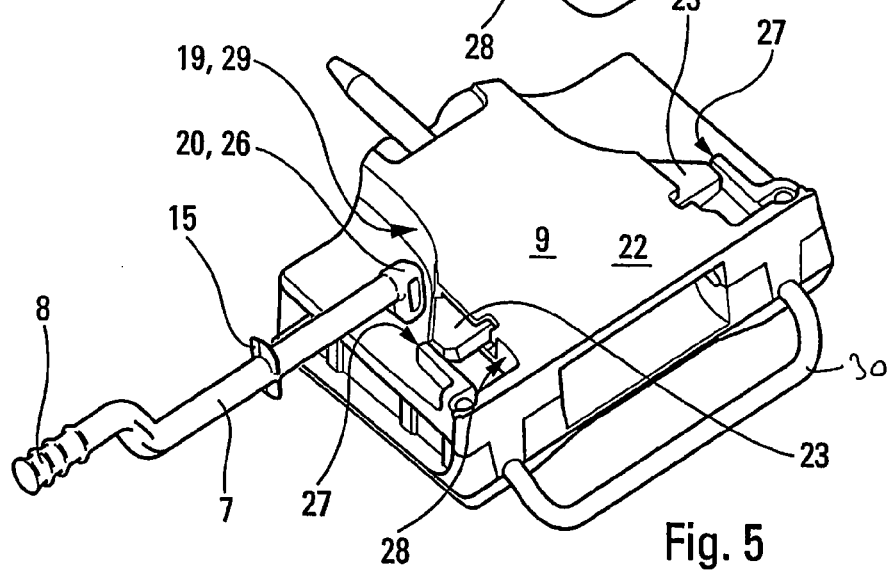

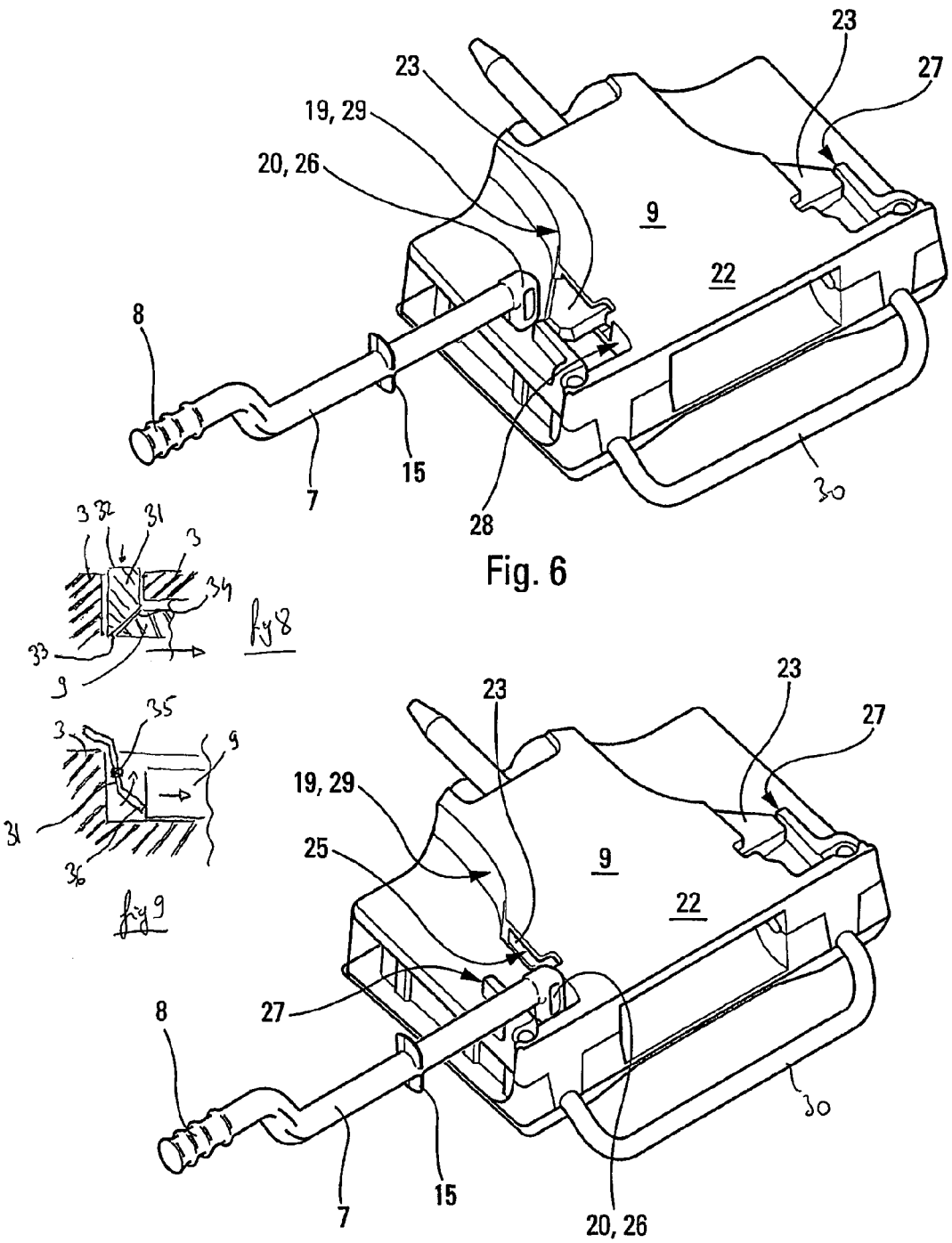

HOUSEHOLD APPLIANCE HINGE WITH TWO HINGED PANELS

CROSS REFERENCE TO RELATED PATENT APPLICATIONS

The present application is a U.S. National Stage filing of Patent Cooperation Treaty ("PCT") application serial number PCT/FR2004/001289, filed May 25, 2004, which in turn claims priority to France Patent Application Serial Number 0306520, filed May 28, 2003, both of which are hereby incorporated by reference herein in their entireties. PCT/FR2004/1001289 was published in French under PCT Article 21(2) as WO/2004/109047 on Dec. 16, 2004.

FIELD OF THE INVENTION

This invention relates to a hinge used to pivot between two panels of a household appliance, for example an electrical appliance such as a meat grill or a sandwich-waffle maker.

BACKGROUND OF THE INVENTION

A hinge enabling two panels of a household appliance to pivot, comprising at least one recess formed in a first panel, and at least one hinge element that is rigidly connected to the second panel and rotatably mounted in the recess is known.

However, the household appliance hinges of the prior art are designed so that the user cannot separate the panels of the apparatus. This separation can be advantageous, however, for example, for facilitating and improving the cleaning of said panels.

DISCLOSURE OF THE INVENTION

The problem to be solved is that of producing a simple, economic, reliable hinge capable of being handled by the user of the household apparatus so as to enable the user to separate and reassemble the panels enabled to pivot by this hinge.

The solution provided by this invention is a hinge as described above, of which the hinge element can move between a retracted position in which it cannot penetrate the recess so as to enable the two panels to be separated, and a pivoting position in which it is suitable for penetrating the recess and performing the pivot when the two panels are properly arranged with respect to one another, wherein the apparatus includes a control element that comprises a gripping member enabling it to be moved manually between a releasing position and a locking position, and which is suitable for cooperating with the hinge element so that the latter is in its retracted or pivoting positions when the control element is in its releasing and locking positions, respectively.

Thus, the user can easily separate and reassemble, as desired, the two panels pivotably connected by the hinge. When it drives the control element from its locking position to its releasing position, the hinge element moves from its pivoting position to its retracted position in which the two panels no longer have a mechanical link between them (the hinge element is located entirely outside the recess), and the two panels can be handled independently of one another. When it drives the control element from its releasing position to its locking position, the hinge element moves from its retracted position to its pivoting position in which the hinge element is suitable for being in the recess: either the two panels are properly arranged with respect to one another, in which case the hinge element is located in the recess and the two panels are assembled and pivotably connected to one another, or they are arranged improperly, in which case the hinge element is located outside the recess and the two panels remain separate.

According to a specific embodiment, a connection element mounted on a panel so as to move between an inactive position and a connection position is suitable for establishing a connection with a complementary element rigidly connected to this panel only when it is in its connection position, which connection element cooperates with the hinge element and is designed so as to be capable of moving from its inactive position to its connection position, if the hinge element is located in the recess, or to a blocking position located between its inactive and connection positions if the hinge element is located outside the recess.

Thus, when the two panels are pivotably connected to one another, the hinge element is in the recess and the connection element is capable of moving between its inactive position and its connection position in which it establishes a connection with the complementary element, and, when the two panels are separated from one another, the hinge element is located outside the recess (regardless of the position of the hinge element) and the connection element is capable of moving from its inactive position to its blocking position and cannot reach its connection position. Such an embodiment is particularly advantageous in electrical household apparatuses whereof at least one of the two panels is capable of being electrically powered: power can be supplied through the connection element only if the two panels are pivotably connected to one another, thus, the hinge acts as a security device.

Other features and advantages will appear in the detailed description of the embodiment shown in the appended drawings, provided solely as an example.

BRIEF DESCRIPTION OF THE DRAWINGS

FIG. 1 is an exploded perspective view of a household apparatus comprising a hinge according to the present invention.

FIG. 2 is a simplified cross-section view of the household apparatus along the axis of the hinge.

FIG. 3 is a bottom perspective view of a control element according to a specific embodiment consistent with the present invention without its protective cover.

FIG. 4 is a simplified perspective view showing the cooperation, in the releasing position, between a rod and control means of a hinge according to a specific embodiment.

FIG. 5 is a view similar to that of FIG. 4, wherein the control means is in the selection position.

FIG. 6 is a view similar to that of FIGS. 4 and 5, wherein the control means is in the blocking position.

FIG. 7 is a view similar to that of FIGS. 4 to 6, wherein the control means is in the connection position.

FIG. 8 is a diagrammatic cross-section view showing the cooperation between the control element and a first type of manual control member.

FIG. 9 is a view similar to that of FIG. 8, wherein the manual control member is of a second type.

DETAILED DESCRIPTION OF THE DRAWINGS

A household apparatus 1 (in this case a waffle iron 1) includes two panels 2, 3 pivotably connected to one another by a hinge 4 that extends along a pivot axis 5.

A first panel 2 comprises a recess 6 on each side, and the second panel 3 similarly comprises a hinge element 8 borne by a rod 7, on each side. For a better understanding, in FIG. 2, the drawing shows a rod 7 only from one side, and the other side is left blank.

The hinge element is formed by a first end of the rod and is suitable for penetrating the corresponding recess 6 so as to form the hinge 4.

Each rod 7 is capable of moving between a retracted position and a pivoting position.

When the rod 7 is in the retracted position, the hinge element 8 cannot penetrate the corresponding recess 6, and, the two panels 2, 3 can therefore be separated.

When the rod 7 is in the pivoting position, the hinge element 8 is in the corresponding recess 6 (provided that the two panels 2, 3 have previously been properly arranged with respect to one another), the hinge 4 is formed, and the two panels are connected to one another so as to pivot about the axis 5 (FIG. 2).

The household apparatus 1 also comprises a control element 9 capable of moving between a releasing position and a locking position. The control element 9 is suitable for cooperating with the two rods 7 so that the latter are in their retracted and pivoting positions when the former is in its releasing and locking positions, respectively. The control element 9 includes a gripping member 30 (in this case a handle) enabling it to be moved manually and easily from one position to the other.

In addition, to improve the reliability of the performance of the control element 9 in its locking position and thus to prevent any undesired movement, it is preferable for the user to apply some effort in order to move the control element 9 from its locking position. To facilitate such a movement while maintaining the reliability of the positioning, the second panel 3 includes a manual control member 31 capable of moving between a rest position and an ejection position. This member 31 is suitable for cooperating with the control element 9 so as to drive the control element from its locking position when it moves from its rest position to its ejection position.

As can be seen in FIG. 8, in a first embodiment, the manual control member 31 is a button 31 that is slidably mounted in the second panel 3. This button 31 includes a manual control surface 32 that is accessible to the user and an inclined surface 33 that is suitable for sliding against a complementary inclined surface 34 of the control member 9 so as to move the latter.

As can be seen in FIG. 9, in a second embodiment, the manual control member 31 is a lever 31 that is mounted so as to pivot with respect to the second panel 3 about a pivot pin 35. This lever 31 includes, in addition to its manual control surface 32, a cam surface 36 which is suitable for coming into contact with the control element 9 and moving it when the lever 31 pivots.

In this example, each rod 7 is urged toward its retracted position by a spring 10. Each rod is slidably mounted with respect to the second panel 3 in the direction of the axis 5 of the hinge 4.

On each side, the second panel 3 comprises a recess 11 through which the corresponding rod 7 passes.

Each recess 11 is delimited on one side by an external wall 12 which is perpendicular to the axis 5, which is adjacent to the corresponding recess 6 of the first panel 2 when the two panels 2, 3 and properly arranged with respect to one another, and through which an external channel 13 passes, through an aperture 14, ending opposite the corresponding recess 6.

Each hinge element 8 is slidably mounted in the corresponding external channel 13. It projects from the corresponding aperture 14 when the rod 7 is in its pivoting position, and is housed in the external channel 13 when the rod 7 is in its retracted position.

For each rod 7, the retracted position is defined by a lug 15 rigidly connected to the rod 7 and coming into contact with an internal wall 16 which delimits the corresponding recess 11, which is opposite the corresponding external wall 12, and through which an internal channel 17 passes in which the rod 7 is capable of sliding.

In this example, the control element 9 is separable from the waffle iron 1, with the separation of the control element 9 from the household apparatus corresponding to a releasing position.

The second panel 3 comprises a cavity 18 in which the control element 9 is capable of sliding in a translation direction perpendicular to the axis 5 of the hinge 4.

The control element 9 includes, on each side, a control surface 19 designed so as to drive, during the movement of the control element 9, a drive element 20 which, in this example, consists of the second end of the corresponding rod 7. The control surface 19 thus acts as a cam surface.

Each internal channel 17 leads, through an aperture 21, to the cavity 18, opposite the control element 9.

Each drive element 20 is slidably mounted in the corresponding internal channel 17, and projects from the corresponding aperture 21, whether the rod 7 is in the pivoting position or in the retracted position.

Thus, in this example, when the two panels 2, 3 of the waffle iron 1 are pivotably connected to one another, the control element 9 is in its locking position in the cavity 18, the two drive elements 20 are caused brought into contact with the control surfaces 19 by the springs 10, the two control surfaces 19 are designed so that, when the control element 9 is in the locking position, the rods 7 are in their pivoting position.

When the user wishes to separate the two panels 2, 3, the control element 9 is driven toward its releasing position (and toward its separation from the second panel 3), as the two springs 10 urge the two drive elements 20 in the direction of the cavity 18, and because of the shape of the two control surfaces 19, the translation of the control element 9 causes the two rods to slide from their pivoting position to their retracted position.

To reassemble the two panels 2, 3, the user places the properly with respect to one another, properly adjusts the control element 9 with respect to the cavity 18 and urges it toward the locking position, while the two control surfaces 19 drive the two drive elements 20 toward the outside of the cavity 18 until the rods 7 are in the pivoting position.

In this embodiment, the waffle iron 1 includes a connection element 22 suitable for enabling power to be supplied to the second panel 3 of the waffle iron 1.

The connection element 22 is mounted so as to move over the second panel 3 between an inactive position and a connection position, and is capable of establishing the electrical connection only when it is in its connection position.

The amplitude of the movement of the connection element 22 is dependent on the positioning of the two panels 2, 3. Indeed, the connection element 22 cooperates with the two rods 7 and is designed so as to be capable of moving from its inactive position, either to is connection position, if the hinge elements 8 are located in their recess 6, or to a blocking position located between its inactive and connection positions, if the hinge elements 8 are outside their recess 6.

In addition, the amplitude of the movement of each rod 7 is also dependent on the positioning of the two panels 2, 3. Indeed, each rod 7 is capable of moving from its retracted position, either to a contact position in which the hinge element 8 is engaged in the corresponding recess 6, if the two panels 2, 3 are pivotably connected to one another, or to a deployed position in which it projects from the aperture 14, past its contact position, if the two panels 2, 3 are separated from one another.

Thus, each rod 7 can occupy the following four successive positions during its translation movement: a retracted position, a pivoting position, the contact position (which is one of the pivoting positions), and a deployed position (only if the hinge element 8 is not in the recess 6).

In addition, the connection element 22 is capable of moving between its inactive position and a selection position located between its inactive and blocking positions, and it is suitable for driving the two rods 7 from their pivoting position to their contact position when it moves from its inactive position to its selection position.

Thus, the connection element 22 can occupy the following four positions during its translation movement: an inactive position, a selection position, a blocking position, and a connection position (only if the hinge element 8 is engaged in the recess 6).

The connection element 22 includes, on each side, a selection member 23 that is capable of moving between a drive position and an activated position.

Each selection member 23 is suitable for cooperating with a corresponding rod 7 so that, when the hinge element 8 is outside the recess 6, it is in its drive position and it drives the rod 7 past its contact position when the connection element 22 moves from its selection position to its blocking position, and, when the hinge element 8 is in the recess 6, the rod 7 drives it from its drive position to its activated position when the connection element 22 moves from its selection position to its contact position.

A spring 24 having a force greater than that of the spring 10 urging the corresponding rod 7, urges the corresponding selection member 23 toward its drive position.

When the connection element 22 is in the inactive position, the rods 7 are in the pivoting position.

To establish the connection so as to enable power to be supplied to the second panel 3, the user urges the connection element 22 from its inactive position to its connection position.

In a first step, the connection element 22 moves from its inactive position to its selection position and therefore drives the two rods 7 from their pivoting position to their contact position. In this particular configuration, each rod 7 cooperates with a corresponding selection member 23 which is in the drive position owing to the spring 24 (FIG. 5).

In a second step, if the two panels 2, 3 are properly arranged with respect to one another, each rod 7 is engaged in its recess 6 and, when the connection element 22 is driven past its selection position, each rod 7 drives the corresponding selection member 23 from its drive position to its activated position. Owing to the configuration of the selection member 23, the connection element 22 can be driven to its connection position (FIG. 7).

In a second step, if the two panels 2, 3 are not properly arranged with respect to one another, the rods 7 are not engaged in their recess 6 and, when the connection element 22 is driven past its selection position, the selection members 23 remain in the drive position and drive the rods 7 in the deployed position (owing to the force ratio of the two springs 10, 24). Due to the configuration of the selection member 23, the movement of the connection element 22 is blocked before it reaches the connection position (FIG. 6).

In this example, each selection member 23 includes a selection surface 25 that is designed so as to drive a bearing element 26 of the rod 7 when the selection member is in its drive position. In addition, the connection element 22 includes, on each side, a stop surface 27 that extends the selection surface 25 when the selection member 23 is in the drive position, and which is designed so as to come into contact with the bearing element 26 when the connection element 22 is in the blocking position. The connection element 22 also comprises a connection surface 28 that extends the selection surface when the selection member 23 is in the activated position, which extends past the stop surface 27 and which is designed so as to hold the hinge element 8 in the recess.

The bearing element 26 is designed so as to be capable of bypassing the stop surface 27 when it slides along the connection surface 28.

In addition, the connection element 22 includes a drive surface 29 that cooperates with the bearing element 26 so as to drive the rod 7 into its contact position when the connection element 22 is moved to its selection position, and which is extended by the selection surface 25.

Thus, when the rod 7 is in the pivoting position, when the connection element 22 is driven in the direction of its selection position, the bearing element 26 comes into contact with the drive surface 29 which acts as a cam surface and drives the rod 7 into its contact position.

If the rod 7 is in the recess, the movement of the connection element 22 and the arrangement of the selection member 23 cause the bearing element 26, in contact with the selection surface 25, to drive the selection member 23 into the activated position, and to slide along the selection surface 25, then along the connection surface 28.

If the rod 7 is not in the recess 6, the movement of the connection element 22 and the arrangement of the selection member 23 cause the bearing element 26 to slide along the selection surface 25 of the selection member 23 in the drive position which acts as a cam surface, and to come into contact with the stop surface 27 which prevents the connection element 22 from reaching its connection position.

In this example, the connection element 22 is formed by the control element 9, and the bearing element 27 is formed by the drive element 20. In addition, the drive surface 29 extends the control surface 19, and the boundary between these two surfaces is unnecessary, with the contact position being a locking position.

It is understood that according to this specific embodiment, the supply of power to the second panel 3 is possible only when the two panels 2, 3 are pivotably connected to one another, with the control element 9 of the hinge 4 being formed by the connection element 22 which is capable of supplying power to the second panel 3

Of course, the invention is not limited to this embodiment, and many modifications can be made to it.

It is thus possible to produce such a hinge in which the control means do not comprise a connection element.

It is possible for the hinge, bearing and drive elements to be borne by a rotating member.

The invention claimed is:

1. A household apparatus (1) comprising:
a first panel (2) pivotably connected to a second panel (3) by a hinge (4), the hinge (4) comprising at least one recess (6) formed in the first panel (2) and at least one hinge element (8) connected to the second panel (3), the at least one hinge element (8) rotatably mounted in the recess (6);
the at least one hinge element (8) capable of moving between a retracted position in which the at least one hinge element (8) cannot penetrate the recess (6) so as to enable the first and second panels (2,3) to be separated and a pivoting position in which the at least one hinge element (8) can penetrate the recess (6) so as to pivotably connect the first and second panels (2,3) when the first and second panels (2,3) are properly arranged with respect to one another; and a control element (9) having a gripping member (30) for enabling the control element (9) to be manually moved between a releasing position and a locking position;

wherein the control element (9) cooperates with the at least one hinge element (8) so that when the control element (9) is in the locking position, the at least one hinge element (8) is in the pivoting position and when the control element (9) is in the releasing position, the at least one hinge element (8) is in the retracted position.

2. The household apparatus (1) according to claim 1 wherein the control element (9) is separable from the first and second panels (2,3), and wherein the separation of the control element (9) from the first and second panels (2,3) corresponds to the releasing position.

3. The household apparatus (1) according to claim 1 further comprising a spring (10) that urges the at least one hinge element (8) toward the retracted position.

4. The household apparatus (1) of claim 1 wherein the control element (9) is slidably mountable to the second panel (3).

5. The household apparatus (1) of claim 1 wherein the at least one hinge element (8) is borne by a rod (7) that is slidably mounted on the second panel (3) so as to be slidable in a direction of an axis (5) of the rod (7).

6. The household apparatus (1) according to claim 5 wherein the control element (9) includes a control surface (19) that drives the rod (7) along the direction of the axis (5) during the movement of the control element (9) between the releasing position and the locking position.

7. The household apparatus (1) according to claim 6 further comprising a connection element (22) movable on the second panel (3) between an inactive position and a connection position, the connection element (22) cooperating with the hinge (4) so as to establish an electrical connection with a complementary element on the second panel (3) only when the connection element (22) is in the connection position.

8. The household apparatus (1) according to claim 7 wherein the control element (9) comprises the connection element (22).

9. The household apparatus (1) according to claim 8 wherein the connection element (22) cooperates with the at least hinge element (8) so that the connection element (22) can be moved from the inactive position to the connection position only when the at least one hinge element (8) is located in the recess (6).

10. The household apparatus (1) according to claim 9 wherein the connection element (22) cooperates with the at least hinge element (8) so that if the hinge element (8) is located outside the recess (6), the connection element (22) is stopped in a blocking position located between the inactive position and the connection position when the connection element (22) is moved from the inactive position toward the connection position.

11. The household apparatus (1) according to claim 10 wherein the at least one hinge element (8) is capable of moving from the retracted position to a contact position in which the at least one hinge element (8) engages the recess (6) of the first panel (2) and the first and second panels (2,3) are pivotably connected or to a deployed position in which the at least one hinge element (8) projects beyond the contact position if the at least one hinge element (8) does not engage the recess (6) and the first and second panels (2,3) are nor pivotably connected.

12. The household apparatus (1) according to claim 11 wherein the connection element (22) is capable of moving between the inactive position and a selection position located between the contact position and the blocking position, the connection element (22) driving the at least one hinge element (8) from the retracted position to the contact position when the connection element (22) moves from the inactive position to the selection position.

13. The household apparatus (1) according to claim 12 wherein the connection element (22) comprises a selection member (23) that is capable of moving between a drive position and an activated position, the selection member (23) cooperating with the at least one hinge element (8) so that when the hinge element (8) is in the contact position and the first and second panels (2,3) are not pivotably connected, the selection member (23) stays in the drive position and drives the hinge element (8) to the deployed position while moving the connection element (22) to the blocked position, and when the hinge element (8) is in the contact position and in the recess (6), the hinge element (8) drives the selection member (23) from its drive position to the activated position while the connection element (22) moves from the selection position to the connection position.

14. The household apparatus (1) according to claim 13 wherein the connection element (22) comprises a spring (24) that urges the selection member (23) toward its drive position, the spring force of the spring (24) of the connection element (22) being greater than that of a spring force of the spring (10) that urges the at least one hinge element (8) to the retracted position.

15. The household apparatus (1) according to claim 14 wherein the selection member (23) comprises a selection surface (25) that drives a bearing element (26) borne by the rod (7), the connection element (22) comprising a stop surface (27) that is aligned with the selection surface (25) when the selection member (23) is in the drive position, the stop surface (27) contacting the bearing element (26) of the rod (7) when the connection element (22) is in the blocked position, the connection element (22) further comprising a connection surface (28) that is aligned with the selection surface (25) when the selection member (23) is in the activated position, the connection surface 28 holding the hinge element (8) in the contact position, and wherein the bearing element (26) bypasses the stop surface (27) when it slides along the connection surface (28).

16. The household apparatus (1) according to claim 15 wherein the connection element (22) comprises the control surface (19), the control surface (19) aligned with the selection surface (25), the control surface (19) cooperating with the bearing element (26) so as to drive the rod (7) into the contact position when the connection element (22) moves from the inactive position to the selection position.

17. The household apparatus (1) according to claim 16 wherein the bearing element (26) is formed by a drive element (20) on an end of the rod (7).

18. The household apparatus (1) according to one of 17 wherein one of the first and second panels (2, 3) includes a manual control member (31) that is capable of moving between a rest position and an ejection position, the manual control member (31) cooperating with the control element (9) 50 as to drive the control element (9) in the direction of the releasing position when the manual control member (31) is moved into its ejection position.

19. The household apparatus (1) according to claim 18 wherein the manual control member (31) is a button (31) that is slidably mounted in the panel (2,3), the manual control member (31) comprising an inclined surface (33) for slidably engaging a complementary inclined surface (34) of the control element (9).

20. The household apparatus (1) according to claim 18 wherein the manual control member (31) is a lever (31) that is mounted to one of the panels (2,3) so as to pivot about a pivot pin (35), the manual control member (31) comprising a cam surface (36) for contacting and moving the control element (9) when the lever (31) pivots.

* * * * *